US008016186B2

(12) United States Patent
Kwak et al.

(10) Patent No.: US 8,016,186 B2
(45) Date of Patent: Sep. 13, 2011

(54) AUTOMATED TELLER MACHINE HAVING A CASSETTE APPARATUS

(75) Inventors: Jae Hoon Kwak, Gyeonggi-do (KR); Woo Ho Lee, Seoul (KR); Hee Chang Lee, Gyeonggi-do (KR); Joon Hyun Yoon, Seoul (KR)

(73) Assignee: Nautilus Hyosung Inc., Seoul (KR)

(*) Notice: Subject to any disclaimer, the term of this patent is extended or adjusted under 35 U.S.C. 154(b) by 1023 days.

(21) Appl. No.: 11/475,133

(22) Filed: Jun. 27, 2006

(65) Prior Publication Data

US 2007/0181667 A1 Aug. 9, 2007

(30) Foreign Application Priority Data

Feb. 3, 2006 (KR) ........................ 10-2006-0010667
Feb. 3, 2006 (KR) ........................ 10-2006-0010668
Feb. 10, 2006 (KR) ........................ 10-2006-0013064

(51) Int. Cl.
*G06Q 40/00* (2006.01)

(52) U.S. Cl. ........................................................ 235/379

(58) Field of Classification Search ................... 235/379
See application file for complete search history.

(56) References Cited

U.S. PATENT DOCUMENTS 3,067,885 A * 12/1962 Kohler ....................... 414/796.6
3,910,567 A * 10/1975 Songer ............................ 271/42
4,361,393 A * 11/1982 Noto ............................ 399/403
4,462,506 A * 7/1984 Ohba ............................ 221/13
4,648,527 A * 3/1987 Chatterson .................... 220/550
4,992,648 A * 2/1991 Hutchison ..................... 235/379
5,632,209 A * 5/1997 Sakakibara ................... 108/145
5,814,796 A * 9/1998 Benson et al. ................ 235/375
5,970,890 A * 10/1999 Harry et al. ..................... 109/73
6,352,254 B1 * 3/2002 Kimura et al. ............... 271/9.12
6,554,185 B1 * 4/2003 Montross et al. ............. 235/379
6,860,375 B2 * 3/2005 Hallowell et al. ............. 194/328
6,902,105 B2 * 6/2005 Koakutsu ...................... 235/379
7,188,836 B2 * 3/2007 Yamamiya .................... 271/177
2006/0157918 A1 * 7/2006 Gaber et al. .................. 271/180

* cited by examiner

*Primary Examiner* — Thien M. Le
*Assistant Examiner* — Christopher Stanford
(74) *Attorney, Agent, or Firm* — Fenwick & West LLP

(57) ABSTRACT

An automatic teller machine (ATM) has a cassette apparatus, detachably accommodated in a cassette accommodating space of the ATM, for storing the cheques endorsed by a printing unit therein. The cassette apparatus includes a storage cassette for stacking the cheques in a cheque storage position thereof, a transfer unit for transferring the cheques provided thereto, a cassette driving unit for driving the transfer unit when the storage cassette is accommodated into the cassette accommodating space, and a stacking unit installed in the cassette accommodating space for taking out the cheques transferred to a designated position and stacking the cheques on the cheque storage position.

14 Claims, 13 Drawing Sheets

AUTOMATED TELLER MACHINE HAVING A CASSETTE APPARATUS

FIELD OF THE INVENTION

The present invention relates to an automated teller machine (ATM) capable of depositing cheques; and, more particularly, to an ATM having a cassette apparatus for accommodating and storing deposited cheques.

BACKGROUND OF THE INVENTION

As one example of automatic banking equipments, an automated teller machine (ATM) enables a user to enjoy various banking services, such as depositing and drawing, offered by banks or credit card companies, without resort to the intervention of a clerk. As the user inserts a bankbook or a credit card into the ATM through an insertion slot, the ATM helps the user to do banking transactions by identifying the user based on information stored in the bankbook or the credit card and displaying a guide note on a display screen. The details of the banking transactions rendered in the ATM are stored in a storage memory of the ATM and, at the same time, are printed on the bankbook and a transaction slip which is to be presented for the user. Cashes or banknotes are then dispensed to the user by the ATM, thus completing the banking transactions.

A large number of cheques are received at a bank window when customers make payment or remittance using the cheques instead of cash. On this occasion, the clerk at the bank window verifies the cheques received from the customers and endorses on the back side of the cheques for official receipt in the case that the verification reveals no abnormality. Each and every cheque thus received is scanned by a scanner to store the image of the cheques in preparation for later information reference.

Such a cheque receiving task is manually conducted by the clerk, which may pose a variety of problems, including errors possibly caused by the manual works, delay in dealing with the duties, reduction in working efficiency and demand for increased manpower. In addition, the manual cheque receiving operation involves a prolonged waiting time from the view point of customers and hence makes the customers feel time-consuming and inconvenient.

In order to achieve a cheque-depositing capability, there has been proposed a side-car module wherein a separate cheque-depositing module is installed immediately next to the ATM side-by-side. However, such a side-car module has a drawback in that an additional space is further required to install it next to the ATM.

On the other hand, U.S. Pat. No. 6,978,927 discloses apparatus and methods of reviewing deposited cheques wherein a user inserts a card into a card reader slot of a cheque depositing ATM. A cheque to be deposited is then inserted into a cheque input/output slot, after which the amount to be deposited is entered. A cheque transportation mechanism receives the cheque and conveys it along a cheque moving path for subsequent processing. The cheque is imaged and verified through communication with a remote bank facility. If the cheque is determined to be unacceptable, it is returned back to the user through the cheque input/output slot.

On the other hand, if the cheque is acceptable, the amount of the cheque is deposited into the user's account and the cheque is conveyed to and stored at a storage bin, at which time a printer makes endorsement on the cheque.

As mentioned above, as ATMs capable of depositing cheques as well as cash are developed to allow an automatic depositing of cheques, which has been manually processed conventionally, there are also developed cheque depositing modules along with cassette apparatuses of various types, for accommodating and storing cheques or banknotes of various sizes, while installing them in the ATM more stably and readily.

SUMMARY OF THE INVENTION

It is, therefore, an object of the present invention to provide an ATM, capable of accommodating and storing therein cheques one by one promptly and precisely after they are undergone through a depositing procedure.

In accordance with the present invention, there is provided an automatic teller machine (ATM) including: a cheque input slot through which cheques are inserted; a transportation unit for transporting the cheques on a leaf-by-leaf basis; a CIS (Contact Image Sensor) unit for scanning the cheques to acquire image information of the cheques; a MICR (Magnetic Ink Character Recognition) unit for acquiring information on magnetic characters printed on the cheques; a printing unit for printing endorsement characters on the cheques supplied from the CIS and the MICR units; and a cassette apparatus, detachably installed in a cassette accommodating space of the ATM, for transferring the cheques inserted through the cheque input slot and stacking the cheques therein.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be descried in detail in connection with the accompanying drawings.

Figure 1:
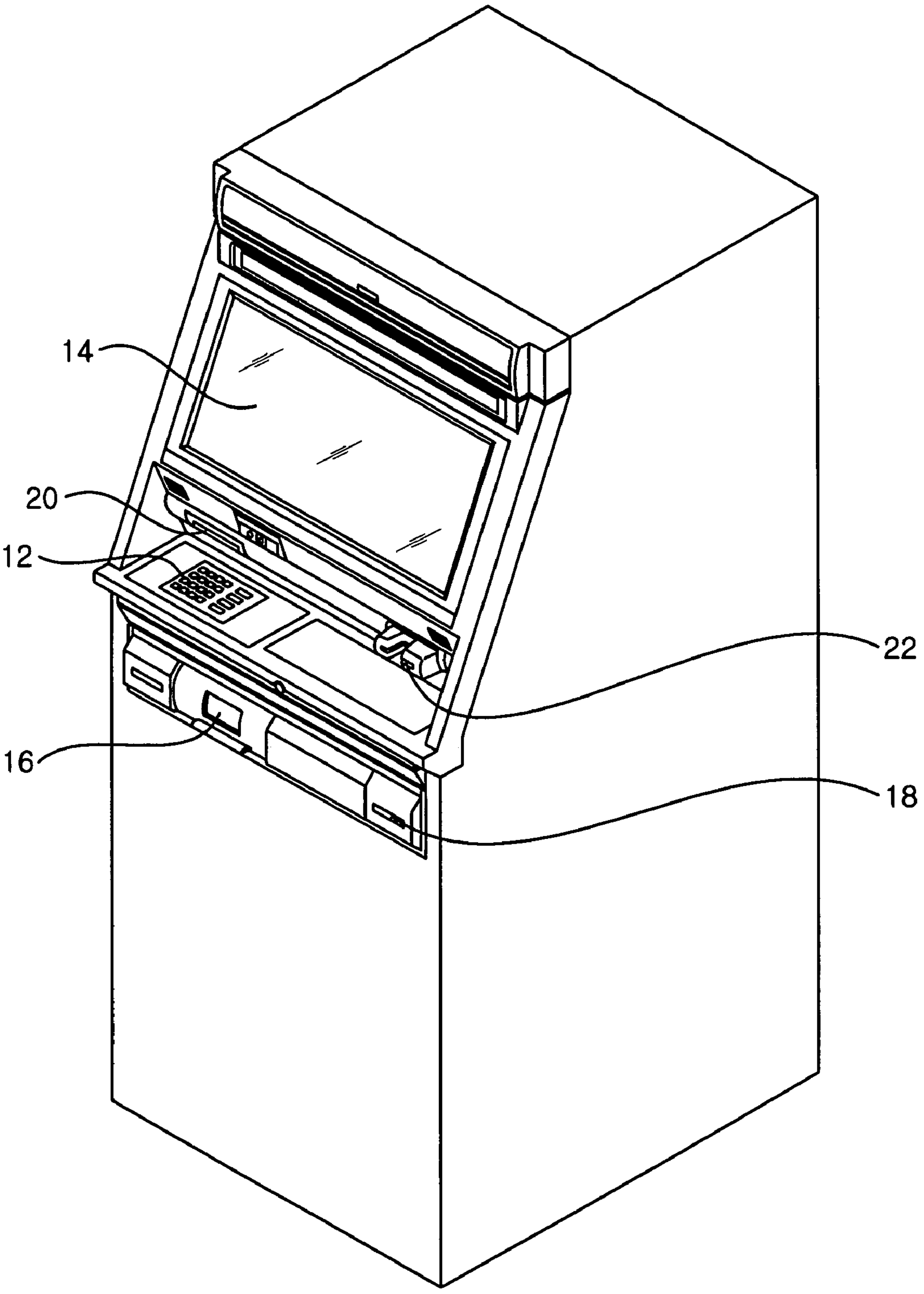
FIG. 1 is a pictorial view schematically showing the external appearance of an ATM in accordance with the present invention.

FIG. 1 is a pictorial view schematically showing the external appearance of an ATM capable of depositing cheques in accordance with the present invention.

The ATM includes: a key pad 12 comprised of a plurality of operational and numeric keys, a display 14 for displaying the information provided with a plurality with keys and the information processed in the ATM; banknote and cheque input/output openings 16 and 18 for allowing a user to enter and take out banknotes and cheques therethrough; and bankbook and card input/output slots 20 and 22 through which a bankbook and a credit card are inserted and returned to the user.

The ATM further includes a cheque-depositing module 100 (see FIG. 2) communicatably associated with the remote host computer (not shown). The cheque-depositing module 100 serves to send a variety of information on the cheque acquired by itself to the host computer. In compliance with the commands received from the host computer, the cheque-depositing module 100 verifies the authenticity of the cheque inputted and deposits the cheque if the cheque reveals no abnormality. More specifically, the cheque inputted by the user is transported forward by means of a transportation mechanism (not shown), during which the information on the cheque is acquired by scanning or other methods. Based on the information thus acquired, verification is made regarding the authenticity of the cheque. If the cheque is determined to be acceptable, it is subjected to depositing process. As the cheque is conveyed through the transportation mechanism, a printer (not shown) makes endorsement on the cheque. If, however, the cheque reveals any abnormality, it is returned to the user.

Although not shown in this drawing, the ATM further includes a cash processing module which records the details of depositing or drawing transaction on the bankbook or the credit card and returns the bankbook or the credit card having the details recorded thereon to the user.

Figure 2:
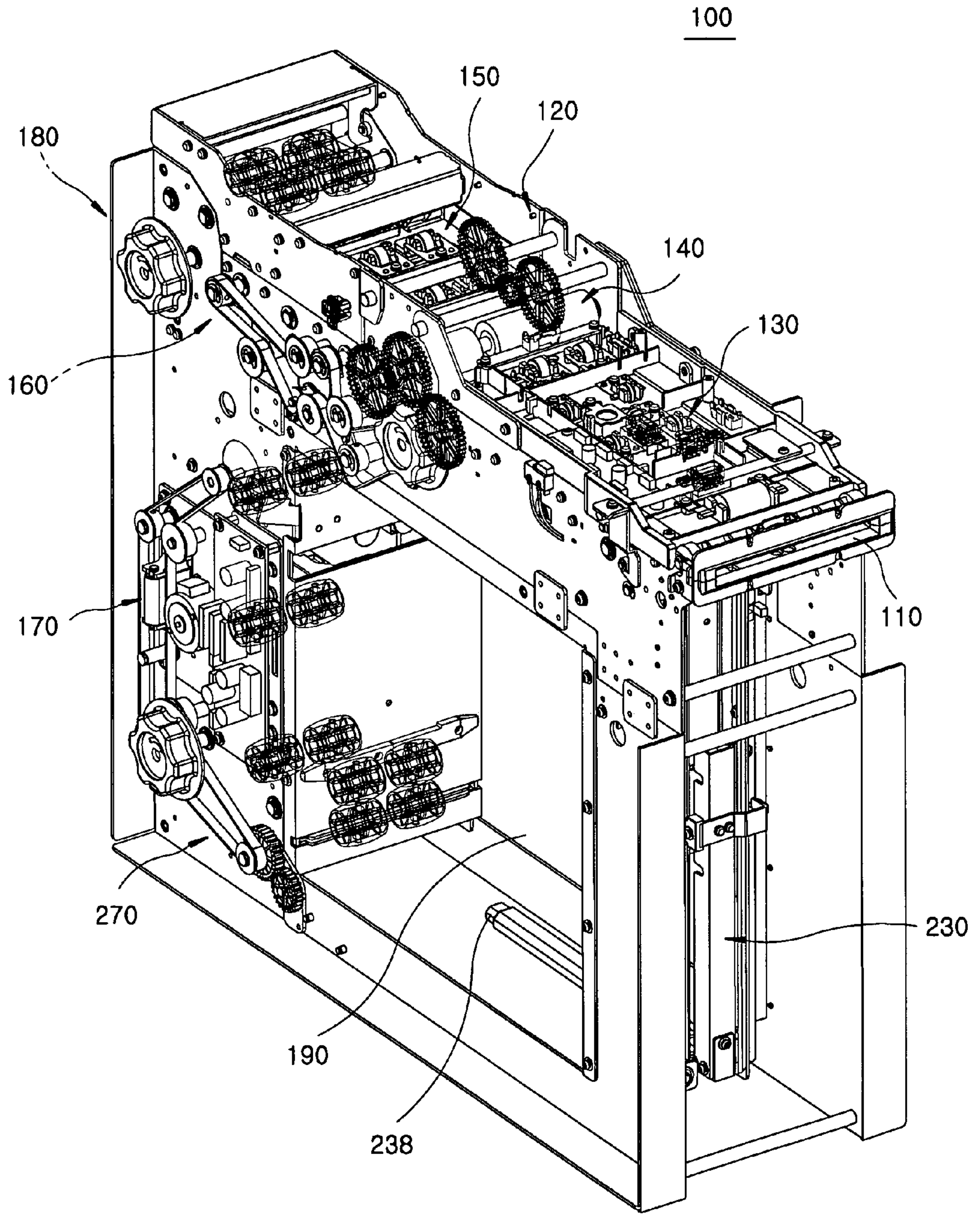
FIG. 2 shows a perspective view of a cheque-depositing module employed in an ATM in accordance with the present invention.

FIG. 2 is a perspective view of the cheque-depositing module 100 employed in the ATM in accordance with the present invention.

As shown in FIG. 2, the cheque-depositing module 100 includes: a cheque input unit 110 through which a user enters or takes out cheques or banknotes on a leaf-by-leaf basis; a transportation unit 120 for transferring the received cheque along a cheque moving path; an alignment unit 130 installed on the cheque moving path, for aligning the cheque at one side of the cheque moving path; a contact image sensor (CIS) unit 140 installed on the cheque moving path, for scanning the cheque on the cheque moving path to obtain image information of the cheque; a magnetic ink character recognition (MICR) unit 150 installed on the cheque moving path, for reading magnetic characters printed on the cheque to obtain magnetic character information of the cheque; a plural cheque leaves detecting unit 160 installed on the cheque moving path, for detecting a presence of two or more overlapped cheque leaves; an endorsement printing unit 170 installed on the cheque moving path, for printing endorsement on the cheque in responsive to a printing instruction; and, a temporary standby unit 180 installed integratedly with the cheque moving path between the MICR unit 150 and the printing unit 170, for allowing the transfer of the cheque to be stopped temporarily.

Further details on the above described components of the ATM are disclosed in U.S. patent application Ser. No. 11/475,138 filed on Jun. 27, 2006, commonly assigned to the Applicant of the present invention.

The cheque-depositing module 100 further includes a cassette apparatus to be installed in a cassette accommodating space 190 provided through the central portion of thereof, for transferring, stacking and storing the cheque transferred thereto. The cassette apparatus includes a storage cassette 200 (see FIGS. 3 and 4), a cassette driving unit 270 (see FIGS. 5 and 6), a transfer unit and a pressurizing unit 220 and 250 (see FIG. 7), a stacking unit 230 (see FIG. 8), and a cassette locking unit 300 (see FIGS. 9 to 11).

Figure 3:
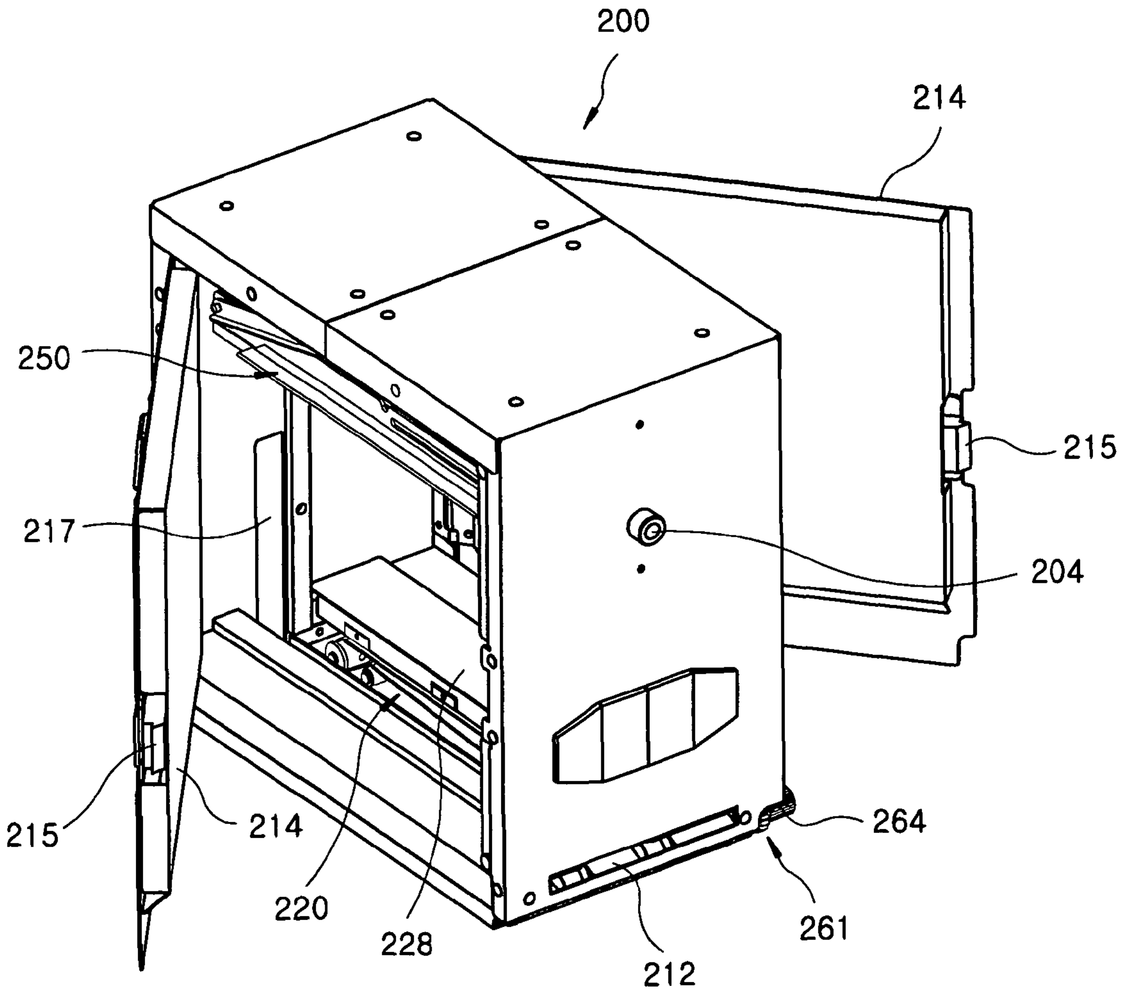
FIGS. 3 and 4 provide a rear and a front perspective view of a storage cassette to be installed in the cassette accommodating space shown in FIG. 2, respectively.
Figure 4:
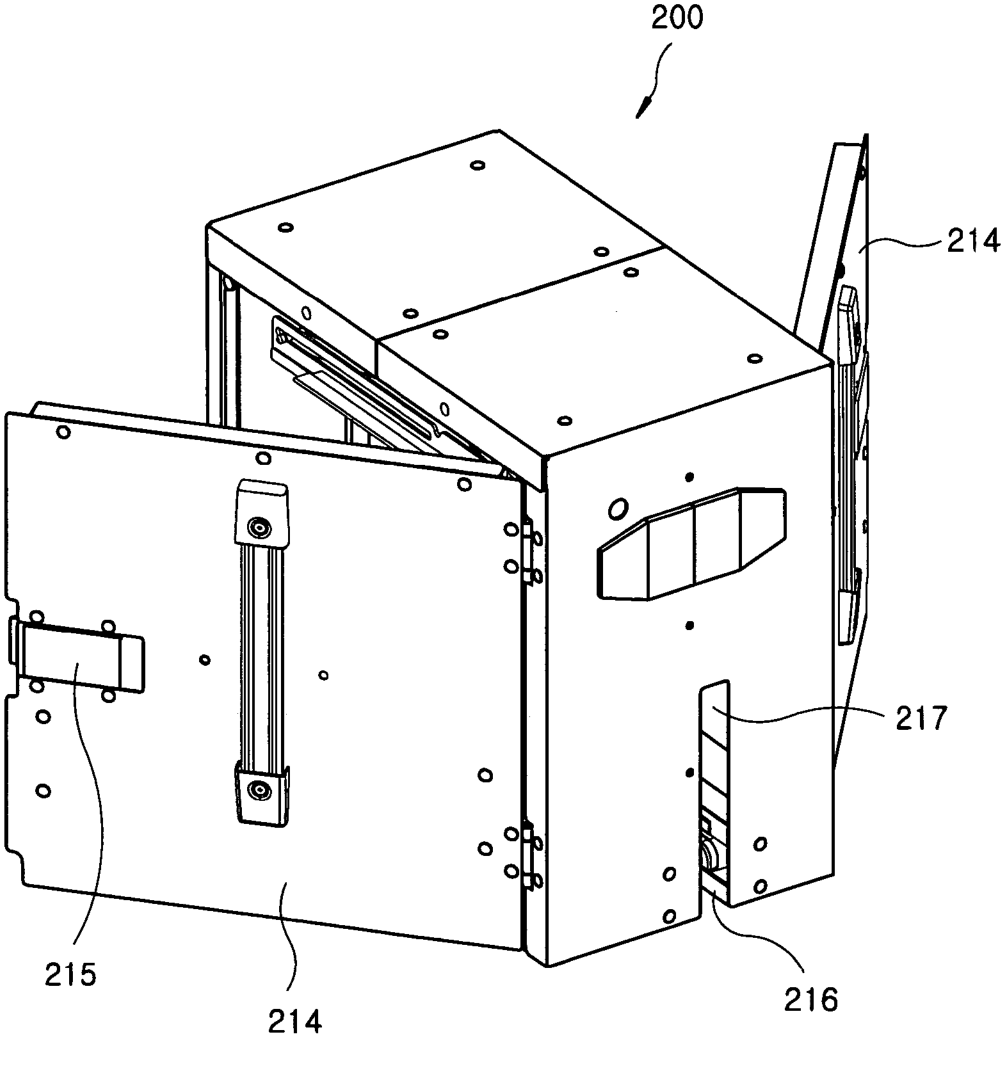

FIGS. 3 and 4 present a rear and a front perspective view of the storage cassette shown in FIG. 2, respectively.

As shown, the storage cassette 200 is accommodated in the cassette accommodating space 190 from one side of the cheque-depositing module 100.

The storage cassette 200 is of a substantially rectangular solid body made of a metal material and has a cheque storage position 228 to receive and store the cheque transferred thereto.

A cheque insertion slot 212 is formed at a lower portion at a rear surface of the storage cassette 200 and communicated with the internal space 228 of the storage cassette 200. The cheque is inserted into the inside of the storage cassette 200 through the cheque insertion slot 212. Also, doors 214 are respectively installed at both opposite sides of the storage cassette 200 with respect to the cheque insertion slot 212.

Each door 214 is hinge-coupled to the storage cassette 200, so that it can swing on hinges to open or close. When the doors 214 are closed, their opening is prevented by a locking device 215.

Further, an engagement protrusion 204 is formed on an upper portion of the rear surface of the storage cassette 200 where the cheque insertion slot 212 is provided. The engagement protrusion 204 is of a cylindrical shape and used to lock the storage cassette 200 by cooperating with a locking unit 300.

Also, a horizontal cutoff portion 216 is formed at a bottom surface of the storage cassette 200 to allow a take-up bar 238 (see FIG. 2) to be accommodated therein and a vertical cutoff portion 217 is formed at a front surface of the storage cassette 200 to vertically guide an up/down movement of the take-up bar 238 therethrough. The horizontal cutoff portion 216 and the vertical cutoff portion 217 are communicated and are perpendicular to each other.

Figure 5:
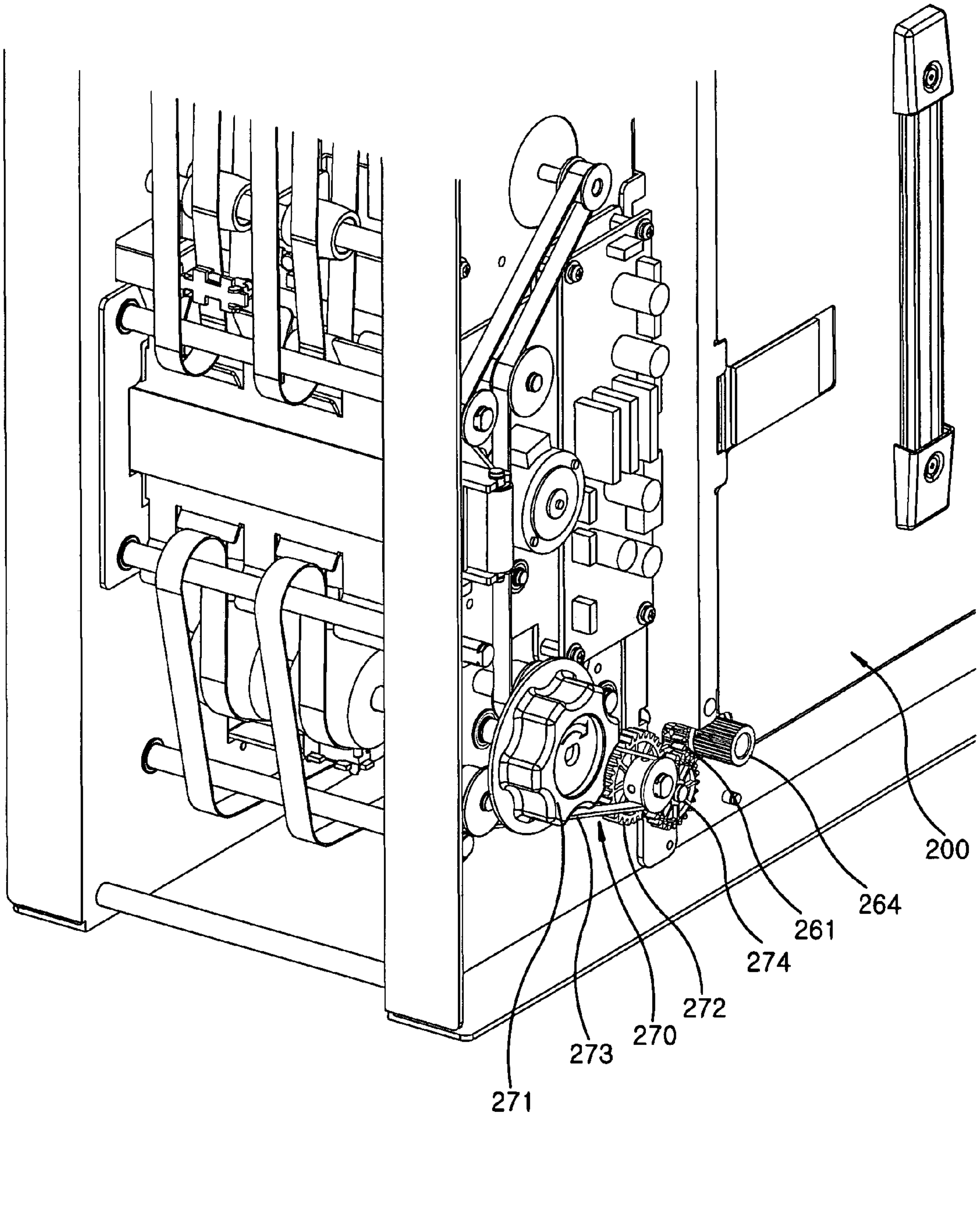
FIGS. 5 and 6 illustrate a perspective view and an enlarged front view of a cassette driving unit shown in FIG. 2.
Figure 6:
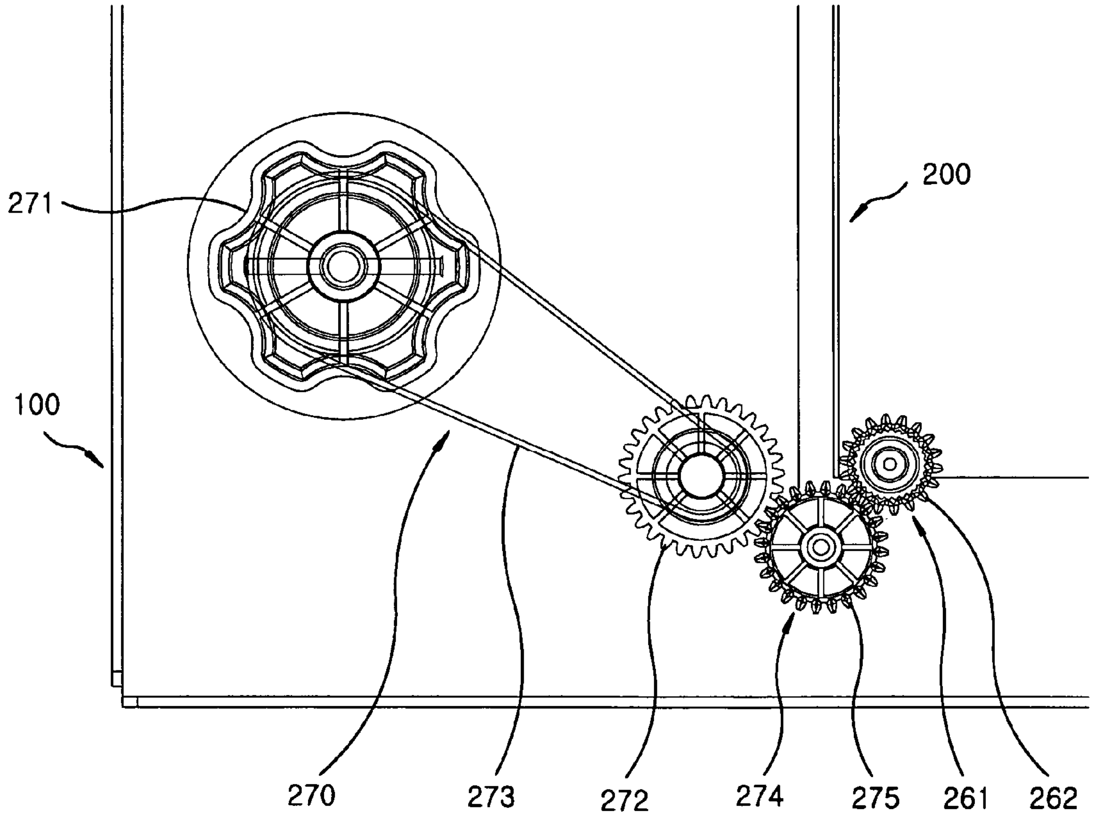

FIGS. 5 and 6 illustrate a perspective view and an enlarged view of the driving unit 270, respectively.

The driving unit 270 is installed adjacent to the cassette accommodating space 190 to drive the storage cassette 200 when the storage cassette 200 is installed into the cassette accommodating space 190. The driving unit 270 includes a motor 271, a first and a second gear 272 and 274, and a timing belt 273.

The motor 271 is installed at one side surface of the cheque-depositing module 100 to provide a motive power, and the first gear 272 is installed apart from the motor 271. Further, a shaft of the motor 271 and the first gear 272 are connected via a timing belt 273, and the second gear 274 having a gear ratio different from that of the first gear 272 is engaged with the first gear 272.

As will be disclosed in detail, the second gear 274 is engaged with a driving gear 261 mounted on the storage cassette 200 to deliver the motive power to the driving gear 261 when the storage cassette 200 is accommodated in the cassette accommodating space 190 from one side of the ATM.

Further, each gear tooth of the first and the second gear 272 and 274 is provided with centripetally inclined surfaces 275 at both ends thereof.

Figure 7:
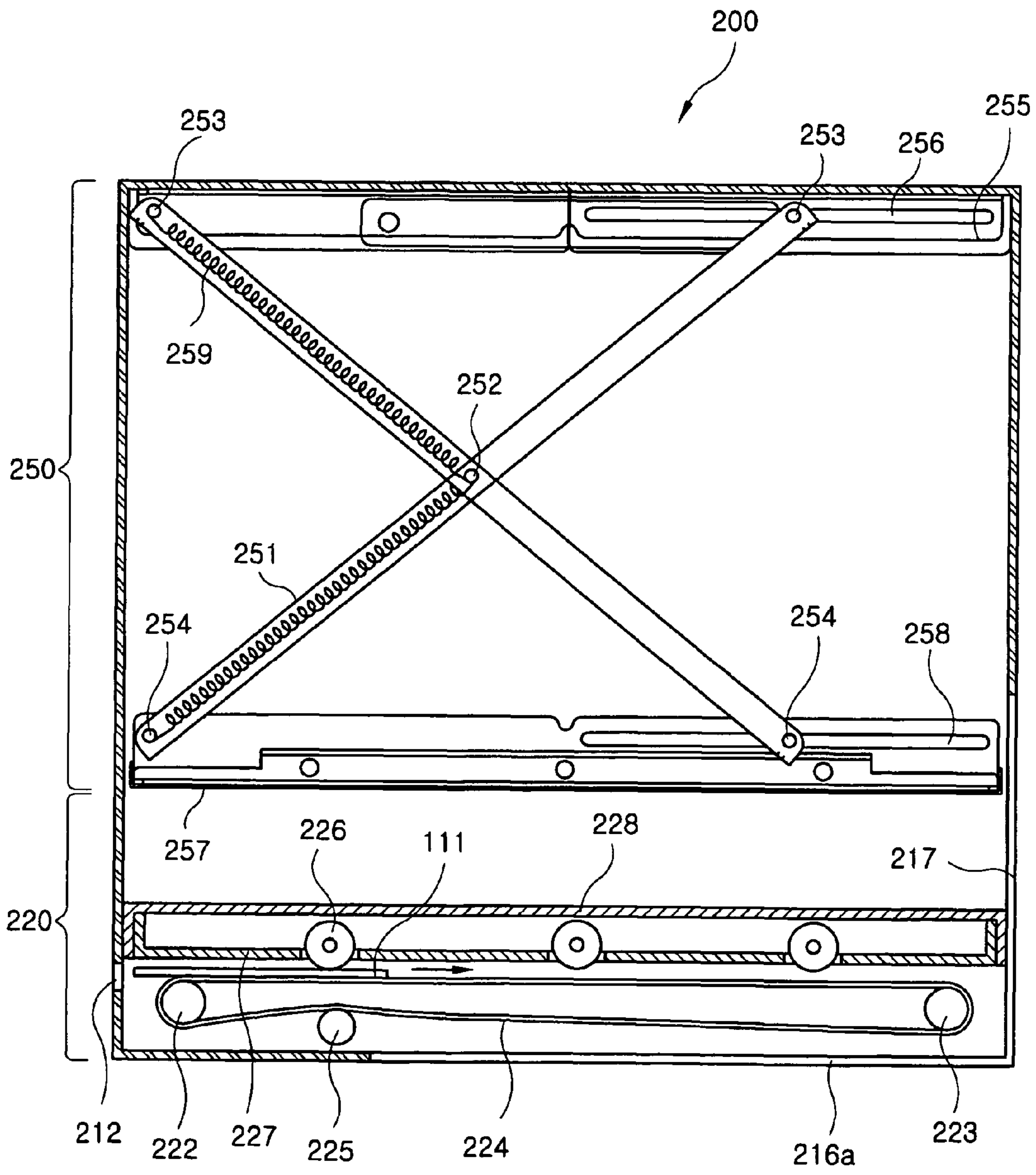
FIG. 7 depicts a cross sectional view of a pressurizing unit and a transfer unit in the storage cassette shown in FIGS. 3 and 4.

Referring to FIG. 7, there is provided a detailed sectional view of a transfer unit and a pressuring unit provided in the storage cassette 200.

First of all, the transfer unit 220 disposed in an inner lower portion of the storage cassette 200, for transferring a cheque to a designated position of the stacking unit 230 while maintaining it even.

The transfer unit 220 is comprised two parts, each part being distanced apart from each other with a central space 229 located therebetween (see FIGS. 12 and 13), and each part having an identical configuration to with each other excepting that one part of them is designed to be powered by the driving unit 270.

Each part of the transfer unit 220 includes a driving roller 222, a follower roller 223, and a belt 224 wherein a coupling shaft 267 is used to connect each part via a rotation shaft 263 to be driven concurrently.

The follower roller 223 is located on the same line as the driving roller 222 to be distanced away therefrom. The belt 224 is connected to the driving roller 222 and the follower roller 223, and serves to transfer the motive power and a cheque 111, which has been inserted through the cheque insertion slot 212, on the top surface of the belt 224. Moreover, an extension roller 225 is further installed between the driving roller 222 and the follower roller 223.

Also, to allow the cheque 111 from the cheque insertion slot 212 to be smoothly transferred on the top surface of the belt 224, a plurality of idle rollers 226 are rotatably installed at a lower case 227 above the belt 224, such that the idle rollers 226 are partially exposed through the bottom surface of the lower case 227 to contact the cheque 111 being transferred on the belt 224. Specifically, the idle rollers 226 are arranged at a designated interval along a lengthwise direction of the belt 224 while maintaining a predetermined interval therebetween. Also, an upper case 228 whose size is substantially identical to that of the lower case 227 is placed on top of the lower case 227.

The cheque 111 is loaded on the belt 224 in the central space 229, and is transferred between the belt 225 and the idle rollers 226 while being maintained evenly.

The transfer unit 220 further includes the driving gear 261 installed at a lower corner portion of the front surface of the storage cassette 200 such that a part thereof is exposed outside. The driving gear 261 is connected to the second gear 274 of the driving unit 270 and is coupled to the driving roller 222 through the shaft 263. A centripetally inclined surface 262 is formed at both sides of each gear tooth of the driving gear 261. Further, a knob 264 for forcibly rotating the driving gear 261 by hand is installed at a front end side of the driving gear 261 which protrudes outside.

When the storage cassette 200 is inserted into the cassette accommodating space 190, the driving gear 261 of the storage cassette 200 is engaged with the second gear 274 of the driving unit 270, to thereby supply the motive power to the transfer unit 220.

More specifically, when the storage cassette 200 is inserted into the cassette accommodating space 190 and this insertion is completed, the driving gear 261 with the inclined surfaces 262 is smoothly engaged with the second gear 274 of the driving unit 270 along the inclined surfaces 275 of the second gear 274.

That is, the inclined surfaces 262 of the driving gear 261 and the inclined surfaces 275 of the second gear 274 serve as guide members for facilitating their engagement.

With the insertion of the storage cassette 200, the engagement between the driving gear 261 and the second gear 274 is completed. Then, if the cheque 111 reaches the storage cassette 200 after passing through a series of cheque depositing steps in the cheque-depositing module 100, the motor 271 is driven by a controller (not shown), and the timing belt 273 connected to the motor 271 delivers the motive force to the first gear 272. The rotation of the first gear 272 causes the second gear 274 and in turn the driving gear 261 to rotate in sequence, whereby the rollers inside the storage cassette 200 are driven as well.

Meanwhile, in case the cheque 111 is jammed by being caught by the rollers when the cheque 111 is loaded into the cassette 200, the motor 271 is stopped, and the user would rotate the rollers reversely by rotating the knob 274, to thereby take out the caught cheque.

When detaching the storage cassette 200 filled with cheques, it is pulled in a direction opposite to the direction in which it is inserted into the cassette accommodating space 190. The moment the storage cassette 200 is detached, the inclined surfaces 272 of the driving unit 270 is smoothly disengaged from the second gear 274 by being guided along the inclined surfaces 275 of the second gear 274.

As described, by disposing the driving unit 270 adjacent to the cassette accommodating space 190 without installing an additional driving unit for driving the storage cassette 200, the storage cassette 200 and the driving unit 270 are allowed to be smoothly engaged with each other when the storage cassette 200 is installed in the cassette accommodating space 190.

Further, referring to an upper portion of FIG. 7, there is shown the pressurizing unit 250 installed at the inner upper portion of the storage cassette 200, i.e. above the transfer unit 220. The pressurizing unit 250 serves to pressurize plural cheques which are stacked leaf-by-leaf on the cheque storage position 228 of the storage cassette 200 by the stacking unit 230, to thereby hold the cheques leaf-by-leaf in place while preventing their separation. The pressurizing unit 250 includes a hinge pin 252 provided at a central intersecting point of an X-shape, and a pair of x-axis bars 251 installed to rotate about the hinge pin 252, while facing each other.

Further, in the pressurizing unit 250, upper and lower connection pins 253 and 254 are also provided to connect upper and lower ends of each x-axis bar 251. The upper connection pin 253 is configured to move horizontally in an upper guide groove 256 of a securing bar 255, which is installed at an inner upper portion of the storage cassette 200 in the lengthwise direction thereof. The lower connection pin 254 is configured to move horizontally in a lower guide grove 258 of a pressurizing plate 257 for pressuring the top of the stack of the cheques.

Preferably, the pressurizing plate 257 has a planar shape and a size capable of covering the top surface of the stack of the cheques.

The pair of x-axis bars 251 is configured to be folded and unfolded on hinge pin 252 as the upper connection pin 253 and the lower connection pin 254 are moved within the upper guide groove 256 of the securing bar 255 and the lower guide groove 258 of the pressurizing plate 257.

Further, an extension spring 259 is installed between the upper connection pin 253 of each x-axis bar 251 and the hinge pin 252 and, also, between the lower connection pin 254 of each x-axis bar 251 and the hinge pin 252. The extension springs 259 serves to assist the pressurizing actions of the x-axis bars 251, i.e., the actions of being folded and unfolded. Therefore, the pressurizing plate 257 is lowered, thus pressurizing the cheques below.

Figure 8:
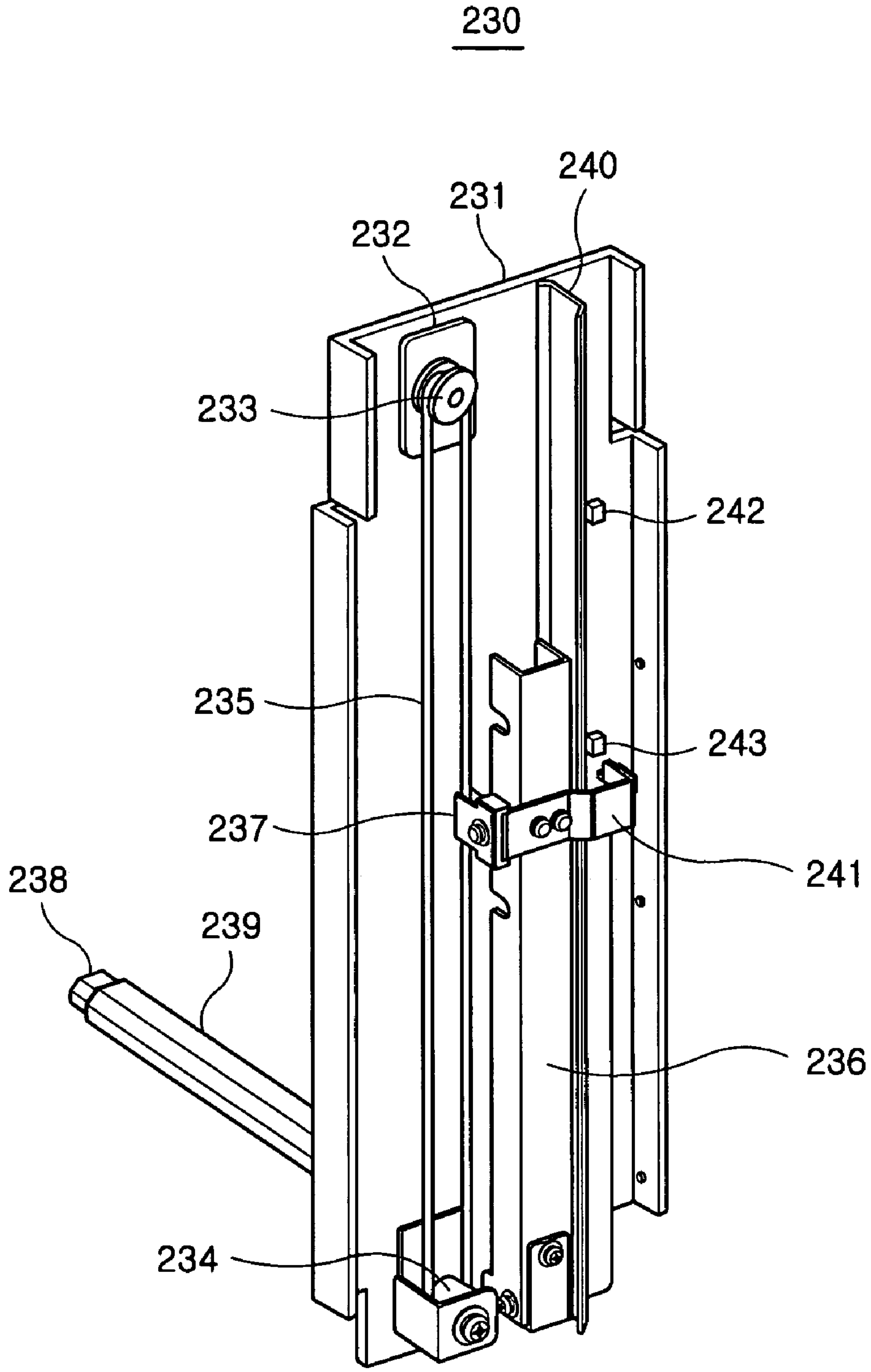
FIG. 8 offers a perspective view of a stacking unit of shown in FIG. 2.

FIG. 8 provides a detailed perspective view of the stacking unit 230 of the ATM shown in FIG. 2.

Referring to FIG. 8 along with FIG. 2, the stacking unit 230 includes a vertical plate 231, a first and a second pulley 233 and 234, a pulley motor 232 and a belt 235.

The vertical plate 231 is fixed at one side of the cassette accommodating space 190 vertically, and the first and the second pulleys 233 and 234 are installed at an upper and lower portion of one surface of the vertical plate 231. The pulley motor 232 is connected to either one of the first or the second pulley 233 and 234 and is capable of rotating the pulley 233 or 234 in forward and backward direction. And, the belt 235 is connected to the first and the second pulleys 233 and 234 to be rotated continuously therebetween forming a track.

Further, a guide bar 236 is connected to the belt 235 via a bracket 237 such that it can be moved up and down depending on the movement of the belt 235. A take-up bar 238 is horizontally disposed at a lower end of the guide bar 236 to be perpendicular thereto. The take-up bar 238 serves to take out the cheques from the central space 229 of the transfer unit 220. Preferably, the outer periphery of the take-up bar 238 is covered with a rubber material 239, whereby the friction between the take-up bar 238 and the cheques can be increased.

Further, a guide rail 240 is further installed on the plate 231 to guide the upward and downward movement of the guide bar 236. A moving bracket 241 is disposed on the guide bar 236 to be perpendicular thereto. Further, an upper sensor 242 and a lower sensor 243 are spaced apart from each other near the guide rail 240 and installed at positions corresponding to those of the cheque storage position 228 and the designated position to detect the moving bracket 241 therebetween.

Figure 9:
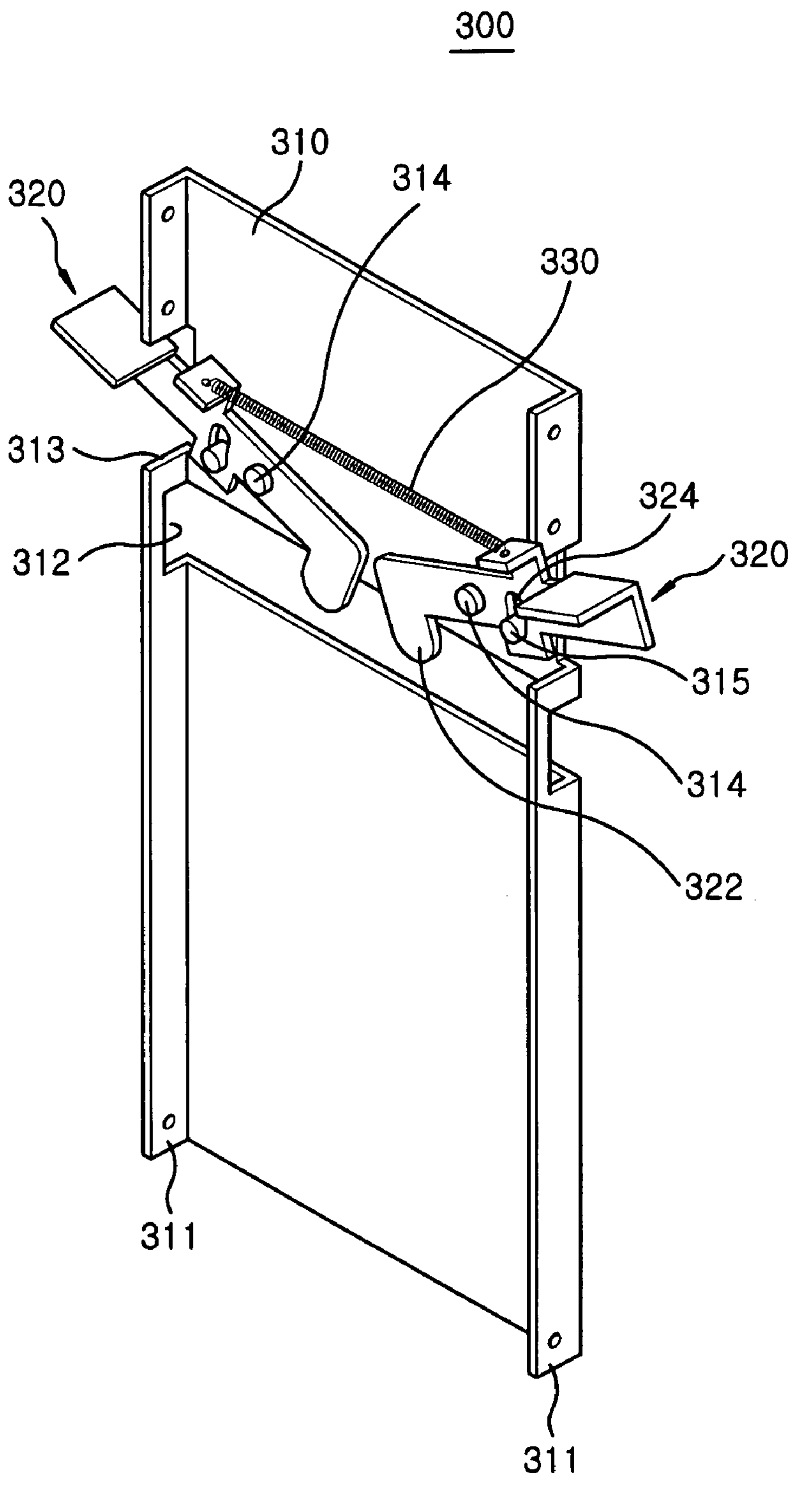
FIG. 9 sets forth a perspective view of a cassette locking unit for the storage cassette shown in FIG. 3.
Figure 10:
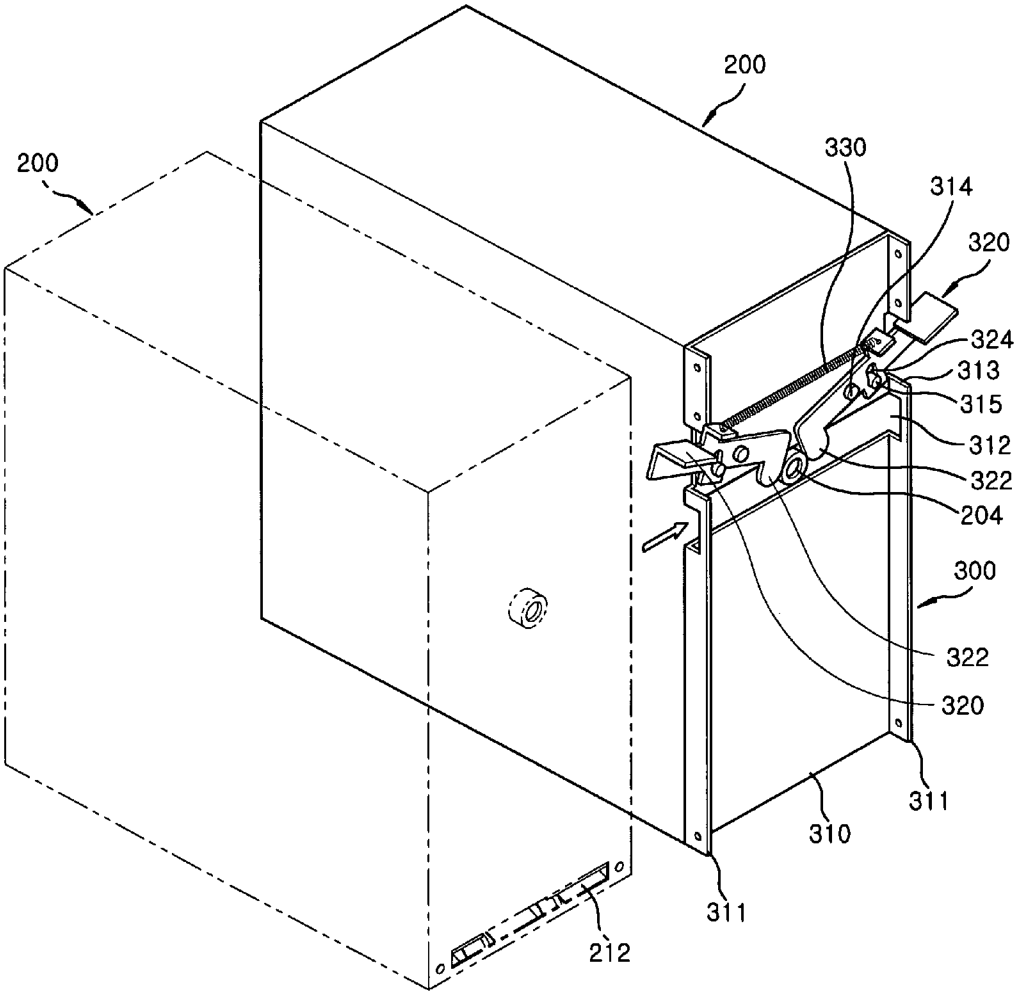
FIGS. 10 and 11 describe the operational status of the cassette locking unit shown in FIG. 9.
Figure 11:
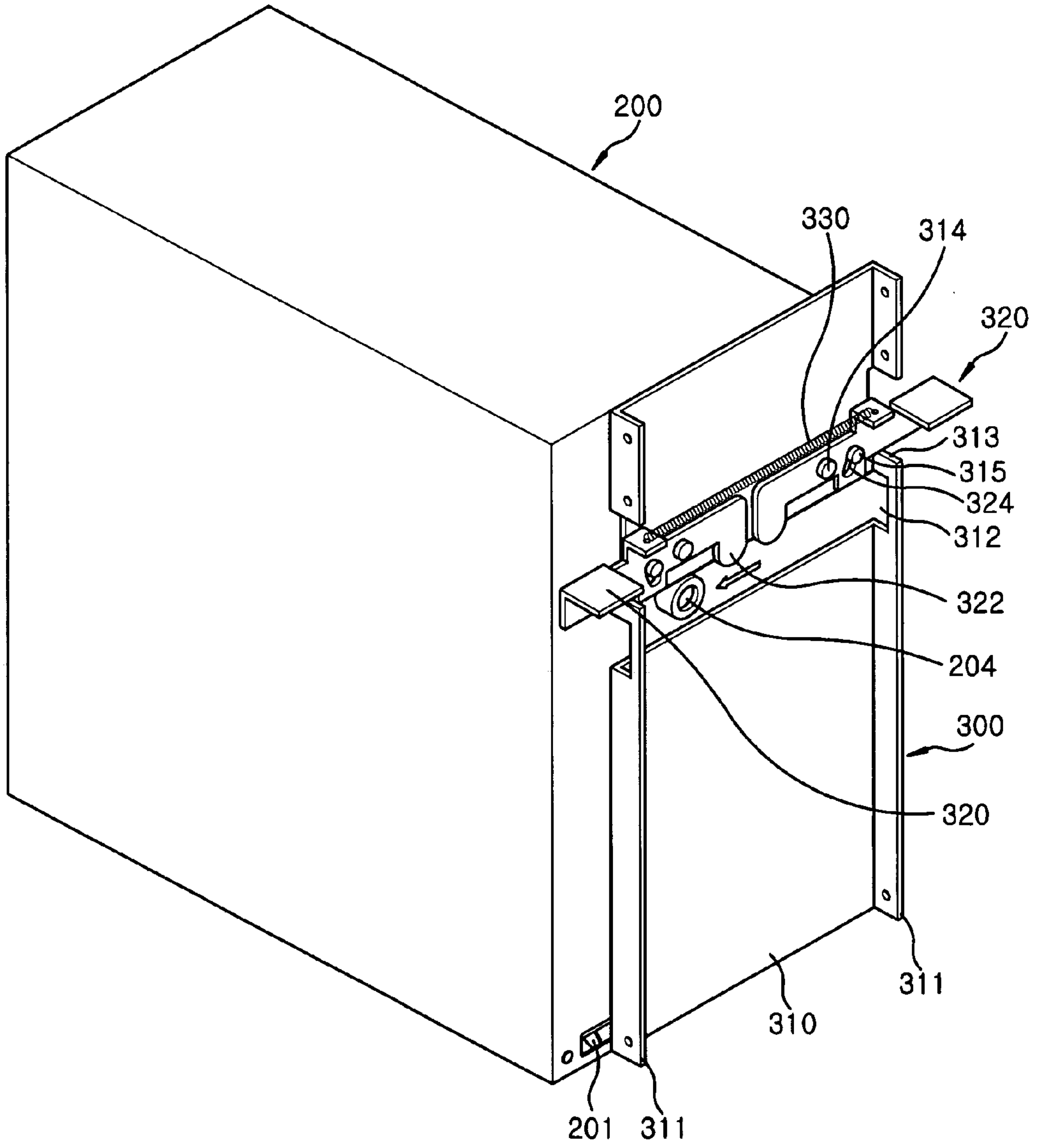

Referring to FIG. 9, there is shown a perspective view of a cassette locking unit for the storage cassette. And, FIGS. 10 and 11 illustrate how the cassette locking unit is operated.

As shown in FIG. 9, the cassette locking unit 300 is used to lock the storage cassette 2000 by locking the engagement protrusion 204 of the storage cassette 200. The cassette locking unit 300 includes a vertical plate 310, a pair of locking pieces 320 and a spring 330.

The vertical plate 310 is formed of a metal and is vertically installed at one side of the cassette accommodating space 190 while facing to the rear surface of the storage cassette 200. Two lateral ends of the plate 310 are vertically bent to form coupling surfaces 311 enclosing the rear surface of the storage cassette 200. Further, the plate 310 is provided with a horizontal groove portion 312 bored thereon in a horizontal direction, and each of the two coupling surfaces 311 is provided with a vertical cutoff groove 313 for confining the rotation of the locking pieces 320 at a position above the horizontal groove portion 312.

Also, a pair of hinge pins 314 is protrudently installed on the plate 310, and the locking pieces 320 are pivotally installed at the hinge pins 314.

Preferably, the locking pieces 320 are formed of the same material as that forming the plate 310. One end of each locking piece 320 is located in a corresponding one of the vertical cutoff grooves 313, and another end opposite thereto 313 is bent vertically, forming an engagement surface 322. The end of the engagement surface 322 is of a round shape.

Further, each locking piece 320 is provided with a vertically elongated hole 324, and securing pins 315 protruded from the plate 310 are located in the vertically elongated holes 324.

Also, a spring 330 is installed to connect top ends of the two locking pieces, while applying a tensile force thereto.

Below, the operation of the cassette locking unit 300 will be described with reference to FIGS. 10 and 11. When the storage cassette 200 is inserted into the cassette accommodating space 190, the engagement protrusion 204 of the storage cassette 200 is inserted in and along the horizontal groove portion 312 of the vertical plate 310. At this time, one end of each locking piece 320 is maintained in the vertical cutoff grooves 313 as the locking pieces 320 pivot upon the hinge pins 314 due to the tensile force of the spring 314. During the insertion of the engagement protrusion 204 continues in an arrow direction shown in FIG. 10, the engagement protrusion 204 would push the engagement surface 322 of one, e.g., a left locking piece, of the locking pieces 320. As the engagement surface 322 of the left locking piece 320 are raised by being pushed by the engagement protrusion 204, the left locking piece 320 is made to pivot upon its hinge pin 314. Then, due to the presence of the spring 330, the rotation of the left locking piece 320 renders the other locking piece 320 rotate as well, thus allowing the engagement protrusion 204 to be inserted therebetween.

If the storage cassette 200 is completely inserted into the cassette accommodating space 190 so that the engagement protrusion 204 is positioned at the center of the horizontal groove portion 312, both the locking pieces 320 are returned to their initial positions by the restoration force of the spring 330, so that the pair of the engagement surfaces 322 are brought into pressurized contact with the circumferential surface of the engagement protrusion 204, while holding the engagement protrusion 204 in place.

Contrary to the above, if a user attempts detaching the storage cassette 200 from the cassette engagement portion 190 forcibly, the engagement protrusion 204 is made to push the engagement surfaces 322 of the left locking pieces 320. Since, however, one end of the left locking piece 320 is confined in corresponding one of the vertical cutoff grooves 313, further forward movement of the engagement protrusion 204 is impossible.

Meanwhile, if the storage cassette 200 is filled with cheques after undergoing through a series of cheque depositing steps, the storage cassette 200 needs to be emptied. Thus, the storage cassette 200 is detached from the cassette accommodating space 190.

For the purpose, as shown in FIG. 11, if a user grabs one end, the end of the left locking piece 320 held in the vertical cutoff groove 313 and forcibly push it downward, said locking piece 320 is made to rotate upon the hinge pin 314 while its engagement surface 322 moves along the circumferential surface of the engagement protrusion 204. Here, the degree of the rotation of the locking piece 320 is determined by the elongated hole 324 in which the securing pin 315 is located, i.e., the locking piece 320 can be rotated within a spatial range of the elongated hole 324.

Due to the presence of the spring 330, the rotation of the left locking piece 320 makes the other locking piece 320 rotate as well, thus allowing the forward movement of the engagement protrusion 204. Then, while holding the locking piece 320, the storage cassette 200 can be taken out of the cassette accommodating space 190 by grabbing a handle (not shown) of the storage cassette 200.

Then, after emptying the storage cassette 200, the storage cassette 200 can be attached back to the cassette accommodating space 190 in the sequence as described above.

As described, the locking device installed at the cassette accommodating space of the cheque-depositing module allows the storage cassette to be attached to the cassette accommodating space readily and firmly, while allowing easy separation therefrom.

Hereinafter, the operation of the cheque-depositing module in the ATM will be described.

If a customer or a bank clerk inserts a leaf of cheque into the cheque input unit 110 of the cheque-depositing module 100, the transportation unit 120 is driven to transfer the received cheque inside the cheque-depositing module 100.

Subsequently, the transferred cheque is aligned at one side of the cheque moving path while passing through the alignment unit 130. Then, the cheque is continuously transferred to the CIS unit 140, where the image information of both sides of the cheque is captured.

Next, the cheque is transferred to the MICR unit 150, where the magnetic character information printed on the cheque is acquired.

Thereafter, the cheque is subjected to the plural cheque leaves detecting unit 160, where it is detected whether plural cheques are overlapped.

Then, an endorsement is printed on the cheque at the printing unit 170, and upon the completion of the endorsement, the cheque is moved to the storage cassette 200 to be stored therein.

Figure 12:
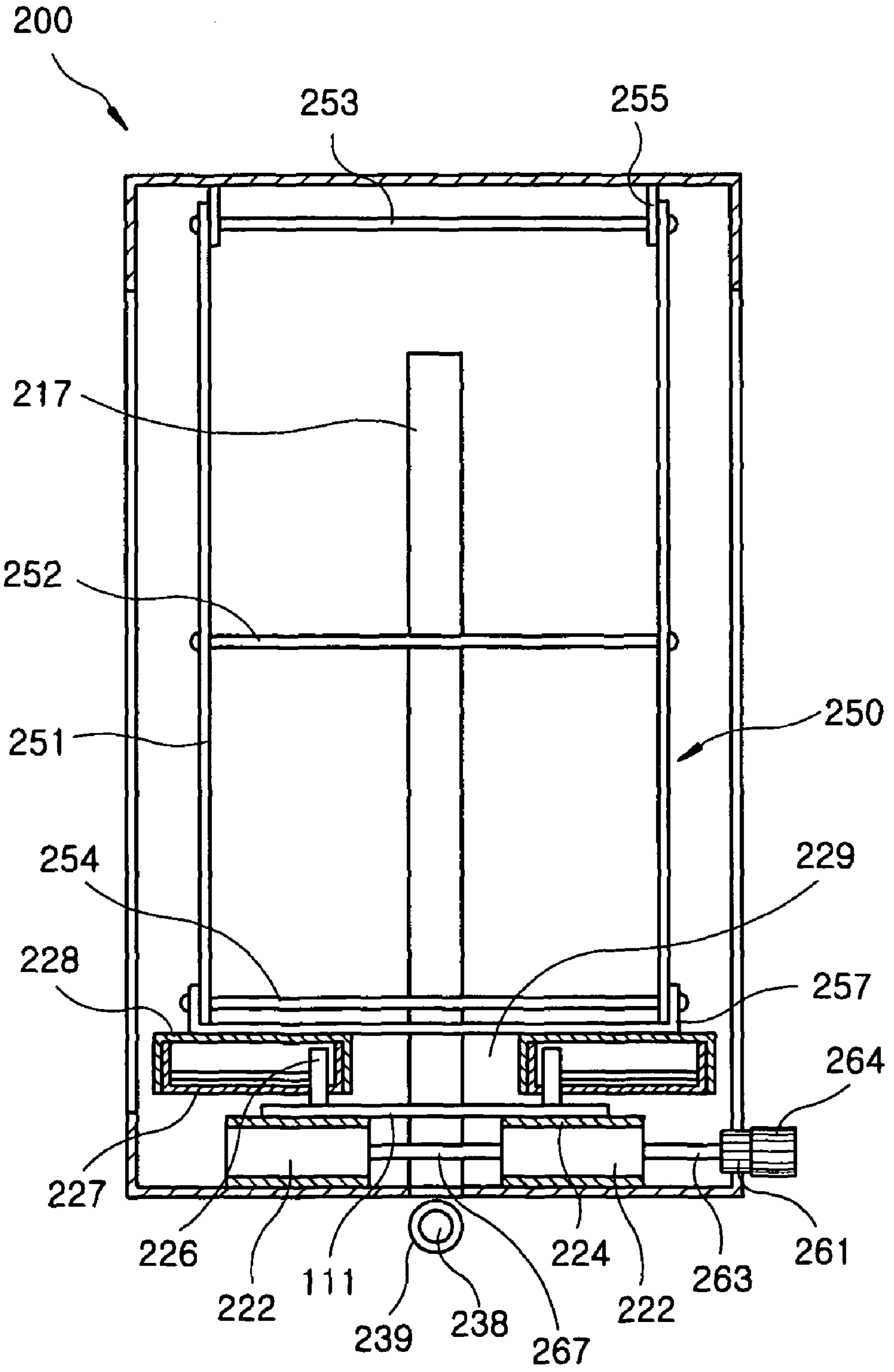
FIGS. 12 and 13 schematically describe how the ATM is operated.
Figure 13:
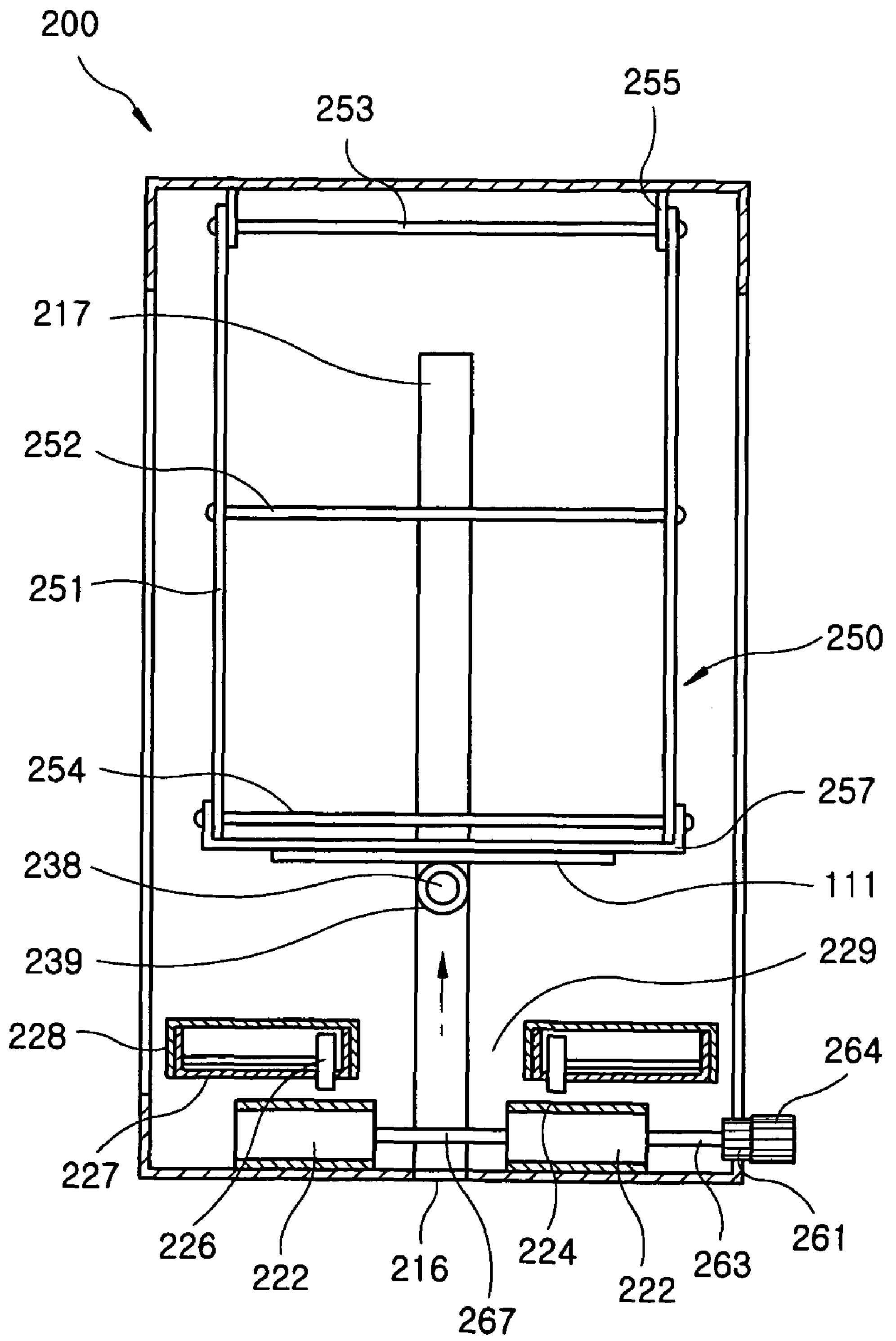

Here, the process for storing the cheques in the storage cassette 200 will be further explained in detail with reference to FIGS. 12 and 13.

First of all, when the storage cassette 200 with its doors 214 closed has been accommodated into the cassette accommodating space 190, the driving gear 261 has been engaged with the second gear 272 of the driving unit 270. In this state, if a leaf of the endorsed cheque is transferred on a leaf-by-leaf basis into the storage cassette 200 through the cheque insertion slot 212, the driving unit 270 drives the driving gear 261 in response to a control signal from a controller (not shown), whereby the driving roller 222 is driven. Then, the driving roller 222 delivers the motive power to the follower roller 223 connected thereto via the belt 224.

After inserted through the cheque insertion slot 212, the cheque 111 is placed on the top of the belt 224. At this time, the idle rollers 226 rotatably supported at the lower case 227 press the top surface of the cheque 111 being transferred on the belt 224, thus facilitating its smooth movement. The cheque 111 is then transferred to a designated position in the upper portion of the central space 229 with loaded on the belt 224.

When the transfer of the cheque 111 is completed up to the designated position, the belt 224 is stopped, and the pulley motor 232 on the plate 231 is driven, whereby the first and the second pulley 233 and 234, and the belt 235 connected thereto are driven as well. Then, the bracket 237 coupled to the belt 235 is made to elevate the guide bar 236 as the belt 235 moves, whereby the take-up bar 238 is elevated into the central space 229 through the vertical cutoff portion 217 of the storage cassette 200, while lifting up the cheque by supporting the center of the cheque.

Accordingly, the cheque 111 is moved upward by the take-up bar 238. Then, when the moving bracket 241 is detected by the upper sensor 242, the take-up bar 238 being elevated with the cheque 111 thereon is stopped. Thereafter, the pulley motor 232 is reversely rotated, whereby the guide bar 236 is moved downward.

The decent of the guide bar 236 makes the take-up bar 238 supporting the cheque 111 descend as well, and the cheque 111 is placed on the upper case 228 due to its weight. Meanwhile, the upward and downward movements of the take-up bar 238 are made along the guide rail 240, and the decent of the take-up bar 238 is completed when the moving bracket 241 of the guide bar 236 is detected by the low sensor 243.

As the input of the cheque 111 is repeated through the above-described operation, plural cheques 111 are stacked on top of the upper case 228, and the pressurizing unit 250 is operated to press the stack of the cheques 111 to hold the cheques in place while preventing their separation.

Accordingly, the cheques 111 stacked on the upper case 228 are kept pressed by the pressurizing plate 257. As the take-up bar 238 is elevated with the cheque 111 thereon, the x-axis bars 251 are unfolded, whereby the pressurizing plate 257 is elevated. Then, with the descent of the take-up bar 238, the pressurizing plate 259 is lowered back again by the extension spring 259, thus pressing the stack of cheques 111 to hold them in place.

If a number of cheques 111 are stacked on the cheque storage position 228 in the storage cassette 200, the storage cassette 200 is drawn from the cassette accommodating space 190. Then, the cheques 111 are taken out of the storage cassette 200 through its one of the two doors 214.

In accordance with the present invention as described above, the ATM is capable of accommodating and storing deposited therein cheques leaf-by-leaf precisely and promptly when they are transferred to the cassette apparatus after passing through a series of depositing process including an image data acquiring step, a cheque informing acquiring step, a cheque abnormality investigating step, an endorsement printing step, and so forth.

While the invention has been shown and described with respect to the preferred embodiments, it will be understood by those skilled in the art that various changes and modifications may be made without departing from the spirit and scope of the invention as defined in the following claims.

What is claimed is:

1. An automatic teller machine (ATM) comprising:

a storage cassette for being detachably installed in cassette accommodating space located within the ATM, a cheque insertion slot formed in the storage cassette for receiving cheques, wherein the storage cassette includes a transfer unit for transferring the cheques received through the cheque insertion slot to a designated position in the storage cassette, the transfer unit installed within an interior of the storage cassette;

a cassette driving unit for driving the transfer unit, the cassette driving unit located in an interior location of the ATM but outside the storage cassette; and a stacking unit for moving the transferred cheques from the designated position to a cheque storage position in the storage cassette, the stacking unit installed outside the storage cassette, the stacking unit comprising:

a pulley motor;

a vertical plate vertically installed at one side surface of the cassette accommodating space to face a front of the storage cassette, wherein said one side surface is located outside of the storage cassette;

a first and a second pulley installed at an upper and a lower portion of the vertical plate, respectively, either one of the first and the second pulley connected to the pulley motor;

a belt placed between the first and the second pulley;

a guide bar moving vertically on the belt;

a take-up bar horizontally installed at a lower end of the guide bar and extending perpendicular to the guide bar, for individually moving the cheques transferred to the designated position to the cheque storage position;

a horizontal cutoff portion formed at a bottom surface of the storage cassette, the horizontal cutoff portion facing the designated position;

a vertical cutoff portion formed at a front surface of the storage cassette, the vertical cutoff portion facing the vertical plate, wherein the horizontal cutoff portion and the vertical cutoff portion communicate with each other and are oriented perpendicular to each other;

a guide rail for guiding the vertical movements of the guide bar, the guide rail installed on the vertical plate;

a moving bracket installed on the guide bar and extending perpendicular to the guide bar; and an upper and a lower sensor for detecting position of the moving bracket, the upper and the lower sensor distanced apart from each other on the vertical plate and installed at a first position corresponding to the cheque storage position and a second position corresponding to the designated position;

wherein the take-up bar is configured to vertically move inside and outside of the storage cassette through the horizontal cutoff portion while guided by the vertical cutoff portion.

2. The ATM of claim 1, wherein the transfer unit includes:

a driving gear;

a driving roller coupled to the driving gear;

a following roller disposed apart from the driving roller;

a belt placed between the driving roller and the follower roller to carry the cheques thereon; and a plurality of idle rollers disposed above the belt at a preset internal in a lengthwise direction of the belt to maintain a surface of the belt coming into contact with the cheques substantially flat.

3. The ATM of claim 2, wherein the cassette driving unit includes:

a motor for providing a motive power;

a timing belt connected to the motor;

a first gear directly connected to the timing belt; and a second gear for providing the motive power to the transfer unit, wherein the second gear is engaged with the driving gear when the storage cassette is at the interior location of the ATM.

4. The ATM of claim 3, wherein each of the driving gear and the second gear has gear teeth, each gear tooth having a centripetally inclined surface formed at both ends of the gear tooth.

5. The ATM of claim 3, wherein the storage cassette is installed detachably with respect to the cassette driving unit.

6. The ATM of claim 1, wherein an outer periphery of the take-up bar is covered with a rubber material to increase a friction with the cheques.

7. The ATM of claim 1, wherein the storage cassette further includes a pressurizing unit for pressing the cheques stacked on the cheque storage position to hold the cheques in place while preventing separation of the cheques, the pressurizing unit installed at an inner upper portion of the storage cassette.

8. The ATM of claim 7, wherein the pressurizing unit includes:

a securing bar disposed at an inner upper portion of the storage cassette, a first guide groove formed on the security bar;

a pressurizing plate for pressing the top of a stack of the cheques stacked on the cheque storage position, a second guide groove formed on the pressurizing plate;

a pair of x-axis bars intersecting via a hinge pin to rotate about the hinge pin; and an upper and a lower connection pin for connecting an upper and a lower end of each x-axis bar, wherein the upper connection pin is configured to move horizontally within the first guide groove of the securing bar, and the lower connection pin is configured to move horizontally within the second guide groove of the pressurizing plate.

9. The ATM of claim 1, further comprising:

a cassette locking unit disposed at the interior location of the ATM, wherein the storage cassette further includes an engagement protrusion formed on a rear surface where the cheque insertion slot is formed, the engagement protrusion fixed to the cassette locking unit for locking the storage cassette.

10. The ATM of claim 9, wherein the cassette locking unit including:

a vertical plate vertically installed at one side surface of the interior location of the ATM and provided with a horizontal groove and two vertical grooves;

a pair of locking pieces respectively located in the vertical grooves and configured to pivot upon a hinge pin protruding from the vertical plate; and a spring for connecting upper ends of the locking pieces and applying a tensile force.

11. The ATM of claim 10, wherein each locking piece is provided with a vertically elongated hole for confining a pivoting movement of the locking piece, and a securing pin inserted into the vertically elongated hole is formed on the plate.

12. The ATM of claim 9, wherein the storage cassette is detachably installed with respect to the cassette locking unit.

13. The ATM of claim 1, wherein the vertical plate is fixed at a surface of the ATM at the interior location of the ATM, and the storage cassette is detachably installed with respect to the vertical plate and the take-up bar.

14. The ATM of claim 1, further comprising:

a cheque receiving unit for receiving the cheques, a cheque input slot formed in the cheque receiving unit;

a transport unit connected to the cheque receiving unit for transporting the received cheques individually;

a first sensor unit for capturing an image of the cheques transported by the transport unit;

a second sensor unit for acquiring information on magnetic characters printed on the cheques transported by the transport unit; and a printing unit for printing endorsement characters on the cheque transported by the transport unit.

* * * * *